B. C. DOWSE.
TIRE.
APPLICATION FILED JUNE 16, 1914.
1,174,238.
Patented Mar. 7, 1916.
Fig_1_
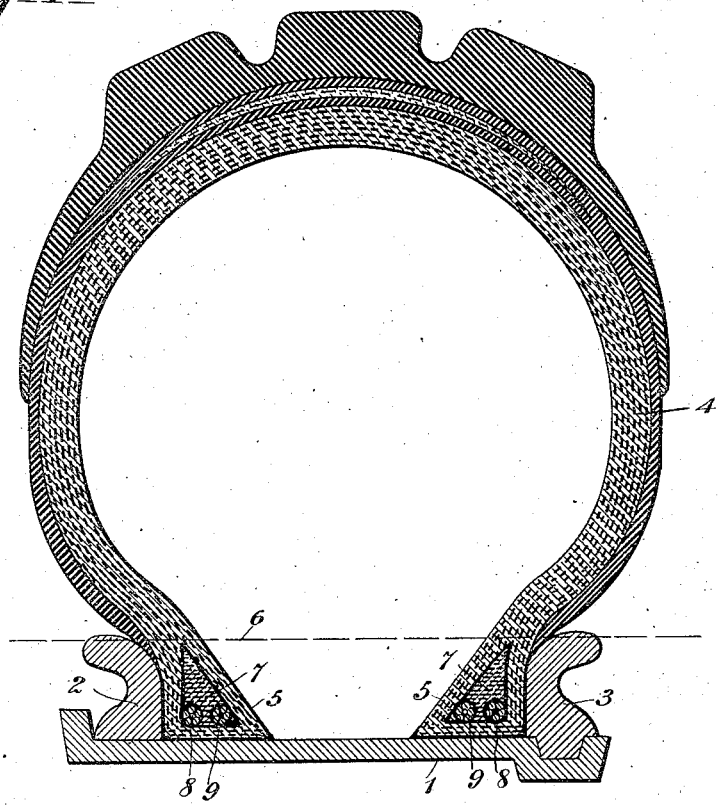
Fig_2_
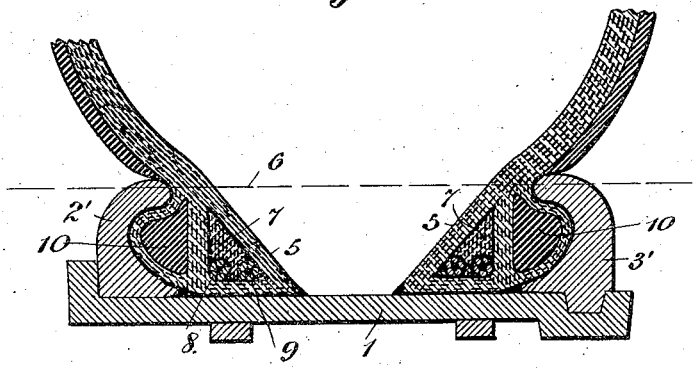
WITNESSES
Frank C. Palmer
A. L. Kitchin
INVENTOR
Byron C. Dowse
BY Munn & Co.
ATTORNEYS

UNITED STATES PATENT OFFICE.

BYRON C. DOWSE, OF CUDAHY, WISCONSIN.

TIRE.

1,174,238. Specification of Letters Patent. Patented Mar. 7, 1916.

Application filed June 16, 1914. Serial No. 845,407.

*To all whom it may concern:*

Be it known that I, BYRON C. DOWSE, a citizen of the United States, and a resident of Cudahy, in the county of Milwaukee and State of Wisconsin, have invented a new and Improved Tire, of which the following is a full, clear, and exact description.

This invention relates to improvements in tires or cases for wheels, and has for an object to provide an improved structure which is of the detachable type, and which presents means for firmly holding the shoe or tire in place without the use of interlocking or clenching members.

Another object of the invention is to provide a shoe with an enlargement at the rim engaging portion together with a reinforcement comprising a plurality of strands of stiffening members.

A still further object is to provide an improved simple strong construction for the rim engaging portions of a shoe or tire which will positively hold the tire in place when the inner tube is inflated, but which will allow the tire or shoe to be readily removed when the inner tube is deflated.

In carrying out the objects of the invention a tire structure of any kind may be used which is provided with annular feet or enlargements or bases designed to engage the rim of the wheel. Arranged in these base sections or portions are flexible fillers, and also anchoring devices in the form of cables for the toe and heel of the base whereby the same is held properly against both the base of the rim and the edges thereof. This double cable base construction positively prevents the tire blowing off the rim and causes a proper action at what may be termed the danger line of the tire, namely, the bending point at the edge of the rim.

In the accompanying drawings—Figure 1 is a section through a tire and a rim embodying the invention; Fig. 2 is a section through a slightly modified form of tire showing the invention applied to a clencher type of tire.

Referring to the accompanying drawings by numeral, 1 indicates a tire of any desired structure having the usual side members 2 and 3 of rim for holding the tire 4 in position. The tire 4 may be made of any desired structure but is provided with bases 5 constructed so as to remain firmly in place, and to eliminate any pinching of the tubes or of the tire blowing off the rim. Also, these bases and the reinforcement therefor are constructed in such a manner that the usual breaking of the side walls is eliminated, and also rim cutting is reduced to a minimum or entirely absent. This is provided by causing the tire to flex or bend easily at what might be termed the danger line 6. At this line the tire must bend or flex while the same is in use, and the movement must be easy and regular without any scraping against the side members 2 and 3. In order to hold the tire properly in place the bases 5 are made comparatively stiff. To allow the easy flex or bending of the tire each of the bases is provided preferably with a triangular filling 7 of fabric impregnated with rubber, though other suitable material capable of being vulcanized may be used. A proper securing anchorage is provided by associating with the filler 7, the cables 8 and 9, one cable being arranged at the heel of the base and the other at the toe. It will be observed that the cables 8 and 9 have individual casings and that they are incorporated with the bottom side of the flexible triangular filler member 7 which constitutes the foundation upon which the tire is built up in the usual manner, well known to those skilled in the art. This effectually prevents the side walls breaking, the rims cutting, the blowing off of the tire or the pinching of the inner tube.

The cables 8 and 9 are made from unstretchable or non-extensible material having great tensile strength and thus effectually anchor the heel and toe of the base in position as shown in Fig. 1. It is to be observed that these anchoring cables are near the bottom of the base and the filling member 7 commonly known as the bead filler falls short of the danger line 6, that is, does not extend up to the danger line so that the tire is allowed to flex or bend back and forth without being resisted by the filler. The filler member, being composed of canvas and rubber, can be vulcanized to the tire casing, hence the flexibility of the triangular filler member is, except as to its bottom reinforced portion, comparable in flexibility with the material of the casing itself.

As shown in Fig. 1 the bases are provided with what are known as straight walls for fitting members 2 and 3, but the bases may be changed from the straight wall structure to the clenched structure as shown in Fig. 2, without departing from the spirit of the invention. Referring to Fig. 2 it will be observed that a clencher filling or extra bead filler is provided for each of the bases for co-acting with the side members 2' and 3', which side members are of a clencher type. The bead fillers 10 may be made of rubber or any other suitable material for providing a good clencher member for the side members or rings 2' and 3'.

What I claim is—

1. In a pneumatic tire casing of the class described, a foundation base having included therein a filler member substantially triangular in cross section, having its apex portion composed of flexible filling material and having its bottom side located closely adjacent to and substantially parallel to the rim surface, said filler having incorporated therein metallic flexible reinforcing means of comparatively small cross sectional area compared with the cross sectional area of the base, said reinforcing means being distributed over and confined to the bottom side of said triangle.

2. In a pneumatic tire casing of the class described, a foundation base having included therein a filler member substantially triangular in cross section, its apex portion being composed of flexible filling material capable of being vulcanized to constitute an integral part of the base having substantially the same physical characteristics as the carcass and having its bottom side located closely adjacent to and substantially parallel with the rim surface, said casing having incorporated therein a pair of separately incased flexible plural-strand wire cables of comparatively small cross sectional area compared with the cross sectional area of the base, said cables being spaced apart from each other and located closely adjacent to the bottom angles of said triangle.

In testimony whereof I have signed my name to this specification in the presence of two subscribing witnesses.

BYRON C. DOWSE.

Witnesses:
A. L. KITCHIN,
PHILIP D. ROLLHAUS.